(12) United States Patent
Maruyama (10) Patent No.: US 11,469,651 B2
(45) Date of Patent: Oct. 11, 2022

(54) DEVICE FOR MANUFACTURING LAMINATED IRON CORE AND METHOD FOR MANUFACTURING LAMINATED IRON CORE

(71) Applicant: MITSUI HIGH-TEC, INC., Fukuoka (JP)

(72) Inventor: Takashi Maruyama, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 0 days.

(21) Appl. No.: 17/009,193

(22) Filed: Sep. 1, 2020

(65) Prior Publication Data

US 2021/0091644 A1 Mar. 25, 2021

(30) Foreign Application Priority Data

Sep. 24, 2019 (JP) .............................. JP2019-172781

(51) Int. Cl.
*H02K 15/02* (2006.01)
*B32B 15/00* (2006.01)
(Continued)

(52) U.S. Cl.
CPC .......... *H02K 15/02* (2013.01); *B32B 15/011* (2013.01); *B32B 37/12* (2013.01); *B32B 38/04* (2013.01); *Y10T 156/107* (2015.01); *Y10T 156/1056* (2015.01); *Y10T 156/1084* (2015.01); *Y10T 156/1085* (2015.01)

(58) Field of Classification Search
None
See application file for complete search history.

(56) References Cited

U.S. PATENT DOCUMENTS

2019/0259531 A1*  8/2019  Okudaria ............... H02K 15/02
2019/0372439 A1   12/2019  Hashimoto et al.

FOREIGN PATENT DOCUMENTS

JP   2009-124828 A    6/2009
JP   2016-171652      9/2016
(Continued)

OTHER PUBLICATIONS

English machine translation of WO2016200024A1 to Kim et al, Dec. 15, 2016, 14 pages. (Year: 2016).*

*Primary Examiner* — Linda L Gray
(74) *Attorney, Agent, or Firm* — Greenblum & Bernstein P.L.C.

(57) ABSTRACT

A device and a method for manufacturing a laminated iron core are provided for including: a first supply unit of supplying a first adhesive to a first part of a predetermined region, the predetermined region corresponding to a punched member of a strip-shaped metal sheet intermittently fed in one predetermined direction; a second supply unit arranged at a downstream side in a conveyance direction of the metal sheet with respect to the first supply unit, and of supplying a second adhesive to a second part different from the first part of the predetermined region; and a punching unit of punching the predetermined region of the metal sheet to which the first supply unit and the second supply unit supply the first adhesive and the second adhesive, so as to form the punched member having the first adhesive and the second adhesive applied on the first part and the second part.

4 Claims, 6 Drawing Sheets

(51) Int. Cl.
*B32B 37/12* (2006.01)
*B32B 38/04* (2006.01)
*B32B 15/01* (2006.01)

(56) References Cited

FOREIGN PATENT DOCUMENTS

WO 2016/200024 12/2016
WO 2018/139001 8/2018

* cited by examiner

DEVICE FOR MANUFACTURING LAMINATED IRON CORE AND METHOD FOR MANUFACTURING LAMINATED IRON CORE

CROSS-REFERENCE TO RELATED APPLICATIONS

This application is based on and claims priority under 35 USC 119 from Japanese Patent Application No. 2019-172781 filed on Sep. 24, 2019, the contents of which are incorporated herein by reference.

TECHNICAL FIELD

The present disclosure relates to a device for manufacturing a laminated iron core and a method for manufacturing a laminated iron core.

BACKGROUND ART

JP2009-124828A discloses a method for manufacturing a laminated iron core in which a strip-shaped metal sheet is fed intermittently, an adhesive is applied from a supply head to one surface of the metal sheet, the metal sheet is punched into a predetermined shape with a punch to form one punched member to which the adhesive is attached, and the one punched member is laminated while being adhered to another punched member already punched with the adhesive.

In JP2009-124828A, applying the adhesive to the one surface of the metal sheet includes applying the adhesive in a spot shape to a plurality of positions in a predetermined region serving as the punched member substantially at the same time. Therefore, the supply head is provided with a plurality of nozzles respectively corresponding to the plurality of positions so as to cover the entire predetermined region serving as the punched member.

In this case, flow paths for the adhesive to reach the plurality of nozzles become complicated in the supply head, and the flow paths tend to be clogged with the adhesive. Therefore, maintenance work takes time and labor, and there is a concern that the manufacturing cost of the laminated iron core increases. In addition, the path difference of each flow path leading to the plurality of nozzles becomes large, and an amount of the adhesive discharged from each of the plurality of nozzles tends to vary. Therefore, the flatness, parallelism, and perpendicularity of the laminated iron core may be affected.

SUMMARY OF INVENTION

Therefore, the present disclosure describes a device for manufacturing a laminated iron core and a method for manufacturing a laminated iron core with which the manufacturing cost of a laminated iron core can be reduced and the laminated iron core can be manufactured with high accuracy.

According to an illustrative aspect of the present disclosure, a device for manufacturing a laminated iron core includes: a first supply unit configured to supply a first adhesive to a first part of a predetermined region, the predetermined region corresponding to a punched member of a strip-shaped metal sheet intermittently fed in one predetermined direction; a second supply unit arranged at a downstream side in a conveyance direction of the metal sheet with respect to the first supply unit, and configured to supply a second adhesive to a second part different from the first part of the predetermined region; and a punching unit configured to punch the predetermined region of the metal sheet to which the first supply unit and the second supply unit supply the first adhesive and the second adhesive, so as to form the punched member having the first adhesive and the second adhesive applied on the first part and the second part.

According to another illustrative aspect of the present disclosure, a method for manufacturing a laminated iron core includes: supplying a first adhesive to a first part of a predetermined region, the predetermined region corresponding to a punched member of a strip-shaped metal sheet intermittently fed in one predetermined direction; supplying a second adhesive to a second part different from the first part of the predetermined region after supplying the first adhesive to the first part; and punching the predetermined region of the metal sheet after supplying the second adhesive to the second part, so as to form the punched member having the first adhesive and the second adhesive applied on the first part and the second part. In this case, the same effects as the device according to Example 1 as mentioned below can be obtained.

According to the device for manufacturing a laminated iron core and the method for manufacturing a laminated iron core of the present disclosure, the manufacturing cost of a laminated iron core can be reduced and the laminated iron core can be manufactured with high accuracy.

DESCRIPTION OF EMBODIMENTS

Hereinafter, an example of an embodiment according to the present disclosure will be described in more detail with reference to the drawings. In the following description, the same elements or elements having the same functions will be denoted by the same reference numerals, and repetitive descriptions thereof will be omitted.

[Configuration of Stator Laminated Iron Core]

Figure 1:
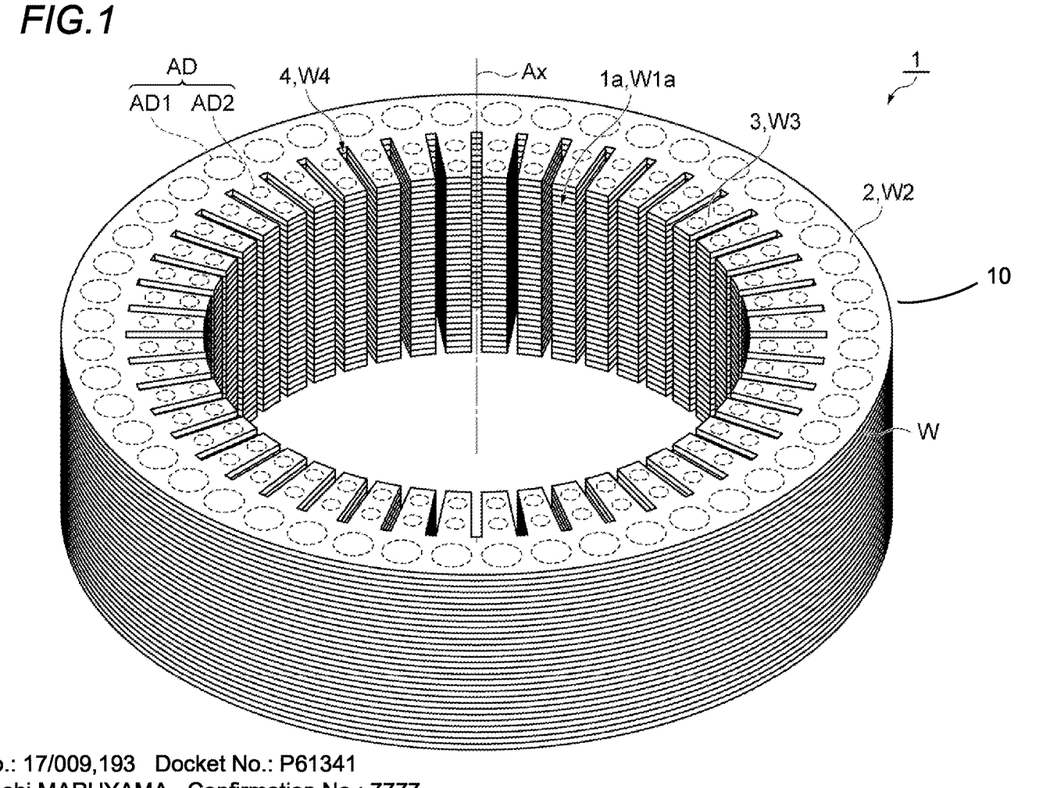
FIG. 1 is a perspective view showing an example of a stator laminated iron core.

First, a configuration of a stator laminated iron core 1 (laminated iron core) will be described with reference to FIG. 1. The stator laminated iron core 1 is a part of a stator. The stator is configured by attaching winding wires to the stator laminated iron core 1. The stator is combined with a rotor to form an electric motor (motor).

The stator laminated iron core 1 has a cylindrical shape. A through hole 1a penetrating the stator laminated iron core 1 is provided in the central portion of the stator laminated iron core 1 so as to extend along a center axis Ax. The through hole 1a extends in a height direction (upper-lower direction) of the stator laminated iron core 1. A rotor can be arranged in the through hole 1a.

The stator laminated iron core 1 includes a yoke portion 2 and a plurality of tooth portions 3. The yoke portion 2 has an annular shape and extends so as to surround the center axis Ax. The plurality of tooth portions 3 extend from an inner edge of the yoke portion 2 toward the center axis Ax side along a radial direction of the yoke portion 2. The plurality of tooth portions 3 protrude from the inner edge of the yoke portion 2 toward the center axis Ax side. The plurality of tooth portions 3 may be arranged at substantially equal intervals in a circumferential direction of the yoke portion 2. A slot 4, which is a space for arranging the winding wire (not shown), is defined between the adjacent tooth portions 3.

The stator laminated iron core 1 is a laminated body in which a plurality of punched members W are laminated. The punched members W are plate-shaped body formed by punching a metal sheet MS (for example, electromagnetic steel plate) described below into predetermined shapes, so as to form a shape corresponding to the stator laminated iron core 1. A through hole W1a is provided in the central portion of the punched members W. The punched member W has a yoke portion W2 corresponding to the yoke portion 2 and a plurality of tooth portions W3 corresponding to the tooth portions 3. A slot W4 corresponding to the slot 4 is defined between the adjacent tooth portions W3.

The stator laminated iron core 1 may be configured by so-called rotating lamination. The term "rotating lamination" refers to laminating a plurality of punched members W while relatively shifting angles of the punched members W. The rotating lamination is performed mainly for the purpose of offsetting the plate thickness deviation of the punched members W and increasing the flatness, parallelism, and perpendicularity of the stator laminated iron core 1. The angles of the rotating lamination may be set to any size.

The punched members W that are adjacent to each other in the height direction (extending direction of the center axis Ax) are adhered to each other with an adhesive AD. The adhesive AD may include, for example, a plurality of spot-shaped adhesives AD1 arranged on a surface of the yoke portion W2. The plurality of adhesives AD1 may be arranged at substantially equal intervals along the circumferential direction of the yoke portion W2. The adhesive AD may include, for example, a plurality of spot-shaped adhesives AD2 arranged on a surface of respective tooth portions W3. In one tooth portion W3, two or more adhesives AD2 may be arranged along a longitudinal direction of the one tooth portion W3 (the radial direction of the punched member W). An area of the adhesives AD1 may be set larger than an area of the adhesives AD2, may be set equal to the area of the adhesives AD2, or may be set smaller than the area of the adhesives AD2.

[Device for Manufacturing Stator Laminated Iron Core]

Figure 2:
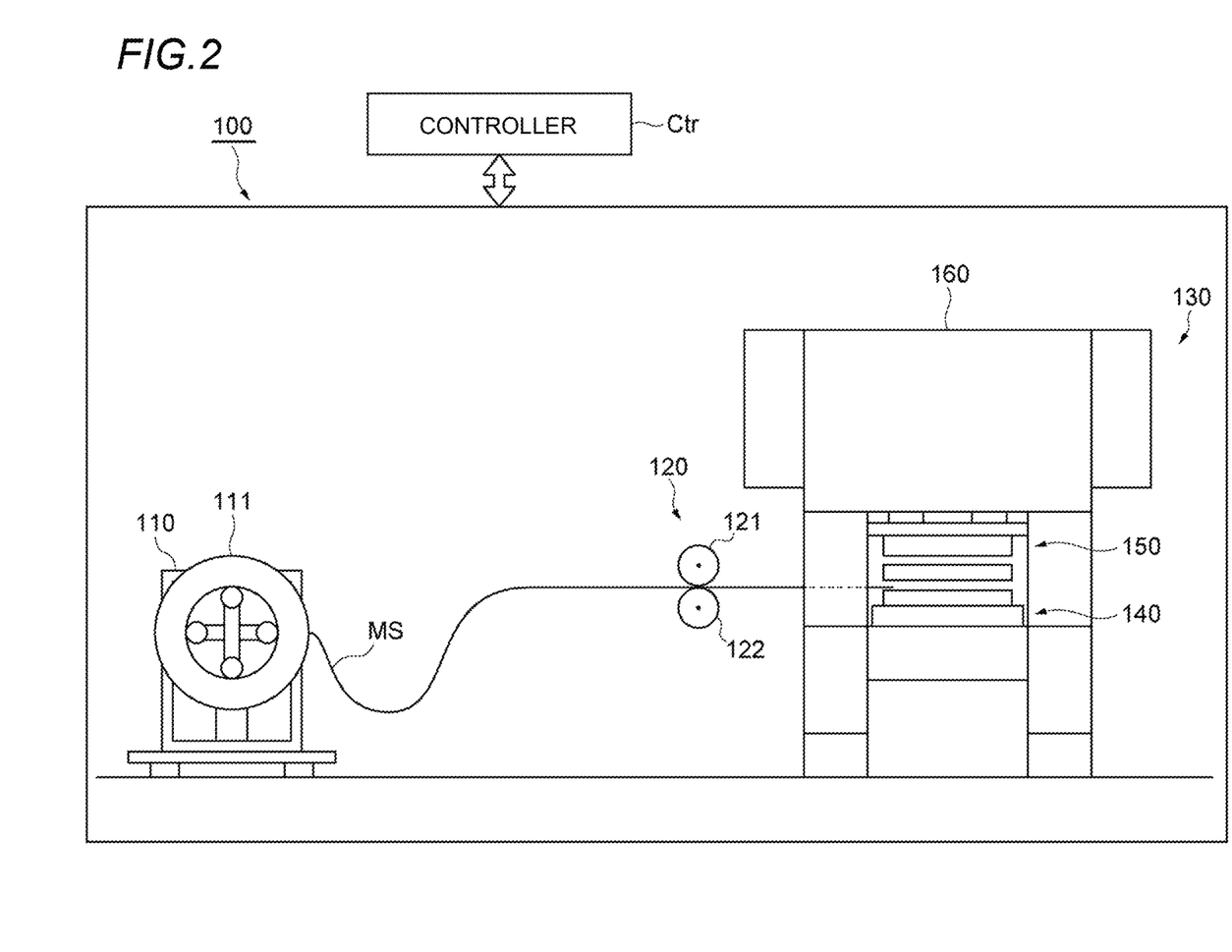
FIG. 2 is a schematic view showing an example of a device for manufacturing a laminated iron core.

Next, a manufacturing device 100 of a laminated iron core will be described with reference to FIG. 2. The manufacturing device 100 is configured to manufacture the laminated body 10 from the strip-shaped metal sheet MS. The manufacturing device 100 includes an uncoiler 110, a feeding device 120, a press processing device 130, and a controller Ctr (control unit).

The uncoiler 110 is configured to rotatably hold a coil material 111. The coil material 111 is a metal sheet MS wound in a coil shape (spiral shape). The feeding device 120 includes a pair of rollers 121, 122 sandwiching the metal sheet MS from an upper side and a lower side. The pair of rollers 121, 122 rotate and stop based on an instruction signal from the controller Ctr, and intermittently and sequentially feed the metal sheet MS to the press processing device 130.

The press processing device 130 is configured to operate based on an instruction signal from the controller Ctr. The press processing device 130 may be configured to sequentially punch the metal sheet MS fed by the feeding device 120 with a plurality of punches, so as to form a plurality of punched members W, for example. The press processing device 130 may be configured to apply an adhesive to the metal sheet MS in the process of punching. The press processing device 130 may be configured to sequentially laminate the plurality of punched members W obtained by punching, so as to form the laminated body 10. The details of the press processing device 130 will be described later.

The controller Ctr is configured to generate an instruction signal for operating the feeding device 120 and the press processing device 130 based on a program recorded in a recording medium (not shown) or an operation input from an operator, for example. The controller Ctr is configured to send the instruction signal to the feeding device 120 and the press processing device 130, separately.

[Details of Press Processing Device]

Figure 3:
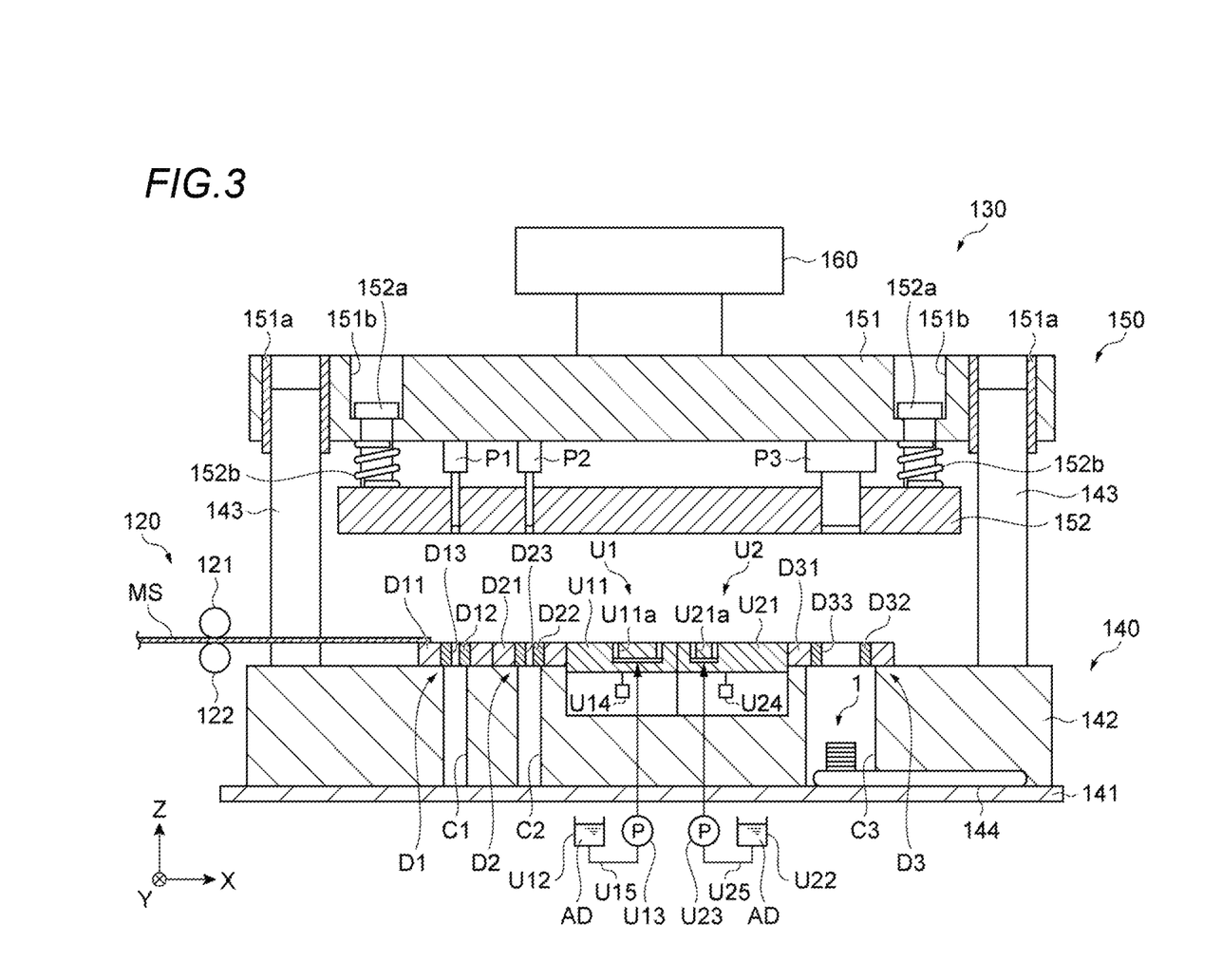
FIG. 3 is a schematic sectional view showing an example of a press processing device.

Next, the details of the press processing device 130 will be described with reference to FIGS. 3 and 4. As shown in FIG. 3, the press processing device 130 includes a lower die 140, an upper die 150, and a pressing machine 160. The lower die 140 includes a base 141, a die holder 142 (platform), die members D1 to D3, supply units U1 and U2, a plurality of guide posts 143, and a conveyance mechanism 144.

The base 141 is fixed on a floor surface, for example, and functions as a base of the entire press processing device 130. The die holder 142 is supported on the base 141. The die holder 142 is formed with a plurality of discharge holes C1 to C3. The plurality of discharge holes C1 to C3 may extend inside the die holder 142 in the upper-lower direction (see arrow Z in FIG. 3). The material punched out from the metal sheet MS (for example, the punched member W, waste material or the like) is discharged to the plurality of discharge holes C1 to C3.

The die members D1 to D3 and the supply units U1 and U2 are attached to an upper portion of the die holder 142. The die member D1, the die member D2, the supply unit U1 (first supply unit), the supply unit U2 (second supply unit), and the die member D3 (punching unit) are arranged in this order from the upstream side to the downstream side in a conveyance direction of the metal sheet MS.

The die member D1 includes a die plate D11 and a die D12. The die plate D11 is configured to hold the die D12 in a through hole provided in a central portion. The die hole D12 configures a first punching unit for punching the metal sheet MS together with a punch P1 described later. As shown in FIG. 3, the die D12 is formed with a plurality of die holes D13 penetrating in the upper-lower direction.

The plurality of die holes D13 may have shapes respectively corresponding to the plurality of slots W4. The number of the plurality of die holes D13 may be the same as the number of the plurality of slots W4 formed in the laminated body 10. The plurality of die holes D13 may be arranged at substantially equal intervals on the circumference of a predetermined virtual circle so as to form a circular shape as a whole.

The plurality of die holes D13 communicate with the discharge hole C1. By inserting and removing the punch P1 in and from the plurality of die holes D13, the first punching unit punches the metal sheet MS in a shape along the contours of the plurality of die holes D13. A metal piece punched out from the metal sheet MS is discharged to the outside of the press processing device 130 through the discharge hole C1.

Figure 4:
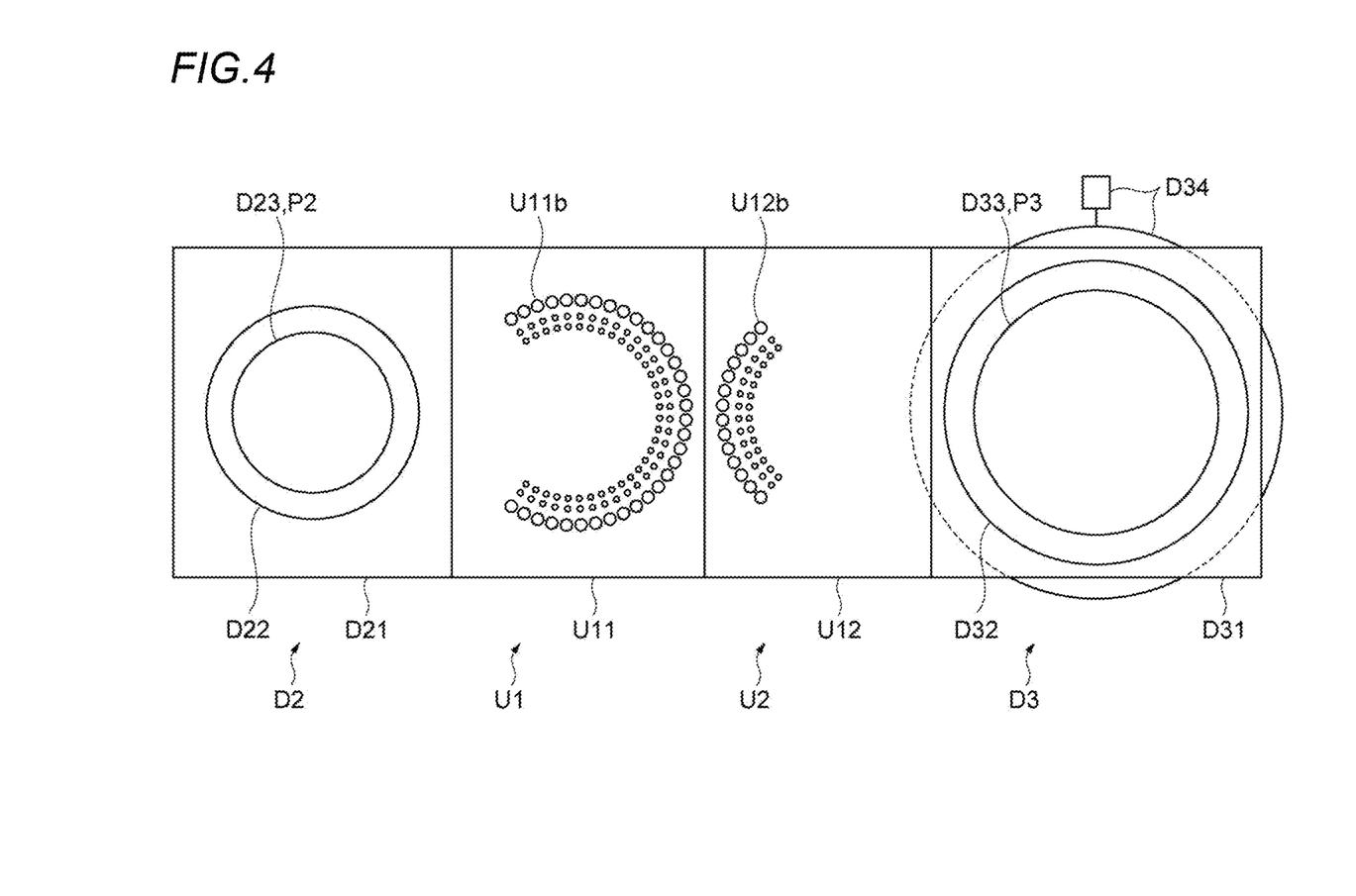
FIG. 4 is a top view showing examples of processing units (a punching unit and an adhesive unit) included in the press processing device.

As shown in FIGS. 3 and 4, the die member D2 includes a die plate D21 and a die D22. The die plate D21 is configured to hold the die D22 in a through hole provided in a central portion. The die hole D22 configures a second punching unit for punching the metal sheet MS together with a punch P2 described later. The die D22 is formed with a die hole D23 penetrating in the upper-lower direction.

The die hole D23 may have a shape corresponding to the through hole W1a. Returning to FIG. 3, the die holes D23 communicate with the discharge hole C2. By inserting and removing the punch P2 in and from the die hole D23, the second punching unit punches the metal sheet MS in a shape along the contour of the die hole D23. A metal piece punched out from the metal sheet MS is discharged to the outside of the press processing device 130 through the discharge hole C2.

The supply units U1 and U2 are configured to supply the adhesive AD to the metal sheet MS separately. The supply unit U1 includes a supply plate U11, a liquid source U12, a liquid feeding mechanism U13, and a drive mechanism U14.

The supply plate U11 is, for example, a plate-shaped body having a rectangular shape. As shown in FIGS. 3 and 4, a flow path U11a in which the adhesive AD can flow and a plurality of discharge ports U11b are formed in the supply plate U11. The flow path U11a is branched and extends so as to reach each of the plurality of discharge ports U11b.

The plurality of discharge ports U11b are arranged radially from the center of the supply plate U11 when viewed from above. In the example shown in FIG. 4, three discharge ports U11b arranged in the radial direction form one first discharge port unit, and a plurality of the first discharge port units are arranged at substantially equal intervals on the circumference of a predetermined virtual circle so as to form an arc shape (major arc shape) as a whole. In other words, in the example shown in FIG. 4, the plurality of discharge ports U11b as a whole have a C-shape that is open toward the upstream side (die member D2 side).

In the example shown in FIG. 4, one discharge port U11b among the three discharge ports U11b arranged in the radial direction which is located radially outward is located so as to correspond to the yoke portion W2 of the punched member W to be formed in a predetermined region of the metal sheet MS. In the example shown in FIG. 4, two discharge ports U11b of the three discharge ports U11b arranged in the radial direction which are located radially inward are located so as to correspond to the tooth portions W3 of the punched member W to be formed in the predetermined region of the metal sheet MS. An opening area of the one discharge port U11b may be set larger than an opening area of the two discharge ports U11b.

The liquid source U12 is a container that stores the adhesive AD. As the adhesive AD, for example, an acrylic or epoxy adhesive may be used. The adhesive AD may be a one-liquid type adhesive or a two-liquid mixed type adhesive. The liquid source U12 is connected to the flow path U11a by a pipe U15. The adhesive AD stored in the liquid source U12 may be referred to as a first adhesive, and a type (which is, for example, ingredient, material or the like) of the first adhesive may be the same as or different from that of the adhesive AD (i.e., second adhesive) stored in a liquid source U22 mentioned below.

The liquid feeding mechanism U13 is arranged in the middle of the pipe U15. The liquid feeding mechanism U13 is configured to operate based on an instruction from the controller Ctr and feed the adhesive AD of the liquid source U12 to the flow path U11a. The liquid feeding mechanism U13 may be, for example, a pump.

The drive mechanism U14 is configured to move the supply plate U11 up and down based on an instruction signal from the controller Ctr. The drive mechanism U14 may be configured to move the supply plate U11 between, for example, a raised position where an upper face (surface) of the supply plate U11 substantially coincides with upper faces (surfaces) of the die plates D11, D21, and D31, and a lowered position where the upper face (surface) of the supply plate U11 is located below the upper faces (surfaces) of the die plates D11, D21, and D31. The drive mechanism U14 may be arranged outside the lower die 140 instead of inside the die holder 142.

Like the supply unit U1, the supply unit U2 includes a supply plate U21, the liquid source U22, a liquid feeding mechanism U23, and a drive mechanism U24. The supply unit U2 differs from the supply unit U1 mainly in the arrangement of a plurality of discharge ports U21b formed in the supply plate U21. The adhesive AD stored in the liquid source U22 may be referred to as the second adhesive, and a type (which is, for example, ingredient, material or the like) of the second adhesive may be the same as or different from that of the adhesive AD (i.e., first adhesive) stored in a liquid source U12 mentioned above.

The plurality of discharge ports U21b are arranged radially from the center of the supply plate U21 when viewed from above. In the example shown in FIG. 4, three discharge ports U21b arranged in the radial direction form one second discharge port unit, and a plurality of the second discharge port units are arranged at substantially equal intervals on the circumference of a predetermined virtual circle so as to form an arc shape (minor arc shape) as a whole. In other words, in the example shown in FIG. 4, the plurality of discharge ports U21b as a whole have a C-shape that is open toward the downstream side (die member D3 side).

In the example shown in FIG. 4, one discharge port U21b among the three discharge ports U21b arranged in the radial direction which is located radially outward is located so as to correspond to the yoke portion W2 of the punched member W to be formed in the predetermined region of the metal sheet MS. In the example shown in FIG. 4, two discharge ports U21b of the three discharge ports U21b arranged in the radial direction which are located radially inward are located so as to correspond to the tooth portions W3 of the punched member W to be formed in the predetermined region of the metal sheet MS. An opening area of the one discharge port U21b may be set larger than an opening area of the two discharge ports U21b.

As shown in FIGS. 3 and 4, the die member D3 includes a die plate D31, a die D32, and a drive mechanism D34. The die plate D31 is configured to hold the die D32 in a through hole provided in a central portion. The die D32 may be held with respect to the die plate D31 so as to be rotatable about a center axis extending along a vertical direction. A rotation holder that holds the die D32 may be interposed between the die plate D31 and the die D32, and the rotation holder may be rotatably held with respect to the die plate D31.

The die hole D32 configures a third punching unit for punching the metal sheet MS together with a punch P3 (punching unit) described later. The die D32 is formed with a die hole D33 penetrating in the upper-lower direction. The die hole D33 may have a shape corresponding to an outer shape of the punched member W. The die hole D33 may have, for example, a circular shape as a whole.

Returning to FIG. 3, the die holes D33 communicate with the discharge hole C3. By inserting and removing the punch P3 in and from the die hole D33, the third punching unit punches the metal sheet MS in a shape along the contour of the die hole D33. The punched member W punched out from the metal sheet MS is laminated on a punched member W punched out previously while being adhered to each other by the adhesive AD. When a predetermined number of punched members W are laminated in the die hole D33, the obtained stator laminated iron core 1 is placed on the conveyance mechanism 144 through the discharge hole C3.

The drive mechanism D34 is connected to the die D32 or a rotation holder (not shown). The drive mechanism D34 rotates the die D32 around the center axis of the die D32 based on the instruction signal from the controller Ctr. Therefore, after the punched member W punched out from the metal sheet MS is laminated on the punched member W punched out previously, the die D32 is rotated by a predetermined angle, so that the succeeding punched member W is laminated on while being rotated with respect to the preceding punched member W. The drive mechanism D34 may be implemented by, for example, a combination of a rotary motor, gears, a timing belt, or the like.

As shown in FIG. 3, the plurality of guide posts 143 linearly extend upward from the die holder 142. The plurality of guide posts 143, together with guide bushes 151a (to be described later), are configured to guide the upper die 150 in the upper-lower direction. The plurality of guide posts 143 may be attached to the upper die 150 so as to extend downward from the upper die 150.

The conveyance mechanism 144 is configured to operate based on an instruction from the controller Ctr and send the stator laminated iron core 1 dropped from the die D32 to a subsequent device (for example, a welding device or the like). The conveyance mechanism 144 may be, for example, a belt conveyor.

The upper die 150 includes a punch holder 151, a stripper 152, and a plurality of punches P1 to P3. The punch holder 151 is arranged above the die holder 142 so as to face the die holder 142. The punch holder 151 is configured to hold the plurality of punches P1 to P3 on a lower surface side thereof.

The punch holder 151 is provided with a plurality of guide bushes 151a. The plurality of guide bushes 151a are located so as to correspond to the plurality of guide posts 143, respectively. The guide bush 151a has a cylindrical shape, and the guide post 143 can be inserted into an internal space of the guide bush 151a. When the guide post 143 is attached to the upper die 150, the guide bush 151a may be provided on the lower die 140.

The punch holder 151 is provided with a plurality of through holes 151b. A step-like step is formed on an inner peripheral surface of the through hole 151b. Therefore, a diameter of an upper portion of the through hole 151b is set smaller than a diameter of a lower portion of the through hole 151b.

The stripper 152 is configured to remove from the punches P1 to P3 the metal sheet MS that is punched into the punches P1 to P3 when the metal sheet MS is punched with the punches P1 to P3. The stripper 152 is arranged between the die members D1 to D3 and the punch holder 151.

The stripper 152 is connected to the punch holder 151 via a connecting member 152a. The connecting member 152a includes an elongated main body portion and a head portion provided on an upper end of the main body portion. The main body portion of the connecting member 152a is inserted into the lower portion of the through hole 151b and can move up and down in the through hole 151b. A lower end of the main body portion of the connecting member 152a is fixed to the stripper 152. A biasing member 152b (for example, a compression coil spring) may be attached around the main body portion of the connecting member 152a so as to exert a biasing force on the punch holder 151 and the stripper 152 in a direction of separating the punch holder 151 and the stripper 152.

A head portion of the connecting member 152a is arranged on the upper portion of the through hole 151b. An outer shape of the head portion of the connecting member 152a is set to be larger than an outer shape of the main body portion of the connecting member 152a when viewed from above. Therefore, the head portion of the connecting member 152a can move up and down in the upper portion of the through hole 151b, but the step of the through hole 151b functions as a stopper and cannot move to the lower portion of the through hole 151b. Therefore, the stripper 152 is suspended and held by the punch holder 151 so as to be movable up and down relative to the punch holder 151.

The stripper 152 is provided with through holes at positions corresponding to punches P1 to P3, respectively. Each through hole extends in the upper-lower direction. Each of the through holes communicates with the corresponding die holes D13, D23, and D33 when viewed from above. Lower portions of the punches P1 to P3 are inserted into the respective through holes. The lower portions of the punches P1 to P3 are slidable in the respective through holes.

The punches P1 to P3 are arranged in this order from the upstream side to the downstream side of the press processing device 130. A lower end portion of the punch P1 has a shape corresponding to the die hole D13. The lower end portion may be, for example, a columnar body having a rectangular cross section. The number of the punches P1 may be the same as that of the die holes D13. The plurality of punches P1 may be arranged at substantially equal intervals on the circumference of a predetermined virtual circle so as to form a circular shape as a whole.

A lower end portion of the punch P2 has a shape corresponding to the die hole D23. The lower end portion may be, for example, a columnar body having a circular cross section. The number of the punches P2 may be the same as that of the die holes D23.

A lower end portion of the punch P3 has a shape corresponding to the die hole D33. The lower end portion may be, for example, a columnar body having a circular cross section.

The pressing machine 160 is located above the upper die 150. A piston of the pressing machine 160 is connected to the punch holder 151 and operates based on an instruction signal from the controller Ctr. When the pressing machine 160 operates, the piston thereof expands and contracts, and the upper die 150 moves up and down as a whole.

[Method for Manufacturing Laminated Body]

Next, a method for manufacturing the stator laminated iron core 1 will be described with reference to FIGS. 3 to 5.

When the metal sheet MS is intermittently fed to the press processing device 130 by the feeding device 120 and a predetermined part of the metal sheet MS reaches the die member D1, the pressing machine 160 operates to push the upper die 150 downward toward the lower die 140. Even after the stripper 152 reaches the metal sheet MS and the metal sheet MS is sandwiched between the stripper 152 and the die member D1, the pressing machine 160 pushes the upper die 150 downward.

At this time, the stripper 152 does not move, but the punch holder 151 and the punches P1 to P3 continue to move downward. Therefore, the tip end portions of the punches P1 to P3 move downward in the respective through holes of the stripper 152 and further reach the die holes D13, D23, and D33. In this process, the punch P1 punches the metal sheet MS along the die hole D13. As a result, the slot W4 corresponding to the slot 4 is formed in the metal sheet MS. The waste material punched out is discharged from the discharge hole C1. Then, the pressing machine 160 operates to raise the upper die 150.

Next, when the metal sheet MS is intermittently fed by the feeding device 120 and the predetermined part of the metal sheet MS reaches the die member D2, the upper die 150 is moved up and down by the pressing machine 160, and the half punching or punching of the metal sheet MS by the punch P2 is performed similarly to the above. As a result, the through hole W1a corresponding to the through hole 1a is formed in the metal sheet MS. The waste material punched out is discharged from the discharge hole C2.

Next, when the metal sheet MS is intermittently fed by the feeding device 120 and the predetermined part of the metal sheet MS (refer to a processing area A1 in FIG. 5) reaches the supply unit U1, the upper die 150 is moved up and down by the pressing machine 160 similarly to the above.

Here, a case where the supply plate U11 is located at the raised position based on an instruction from the controller Ctr to the drive mechanism U14 will be described. At this time, when the upper die 150 is lowered by the pressing machine 160, the processing area A1 of the metal sheet MS is sandwiched by the supply plate U11 and the stripper 152.

Next, the controller Ctr instructs the liquid feeding mechanism U13 to push out the adhesive AD toward the plurality of discharge ports U11b, so that the adhesive AD discharged from the plurality of discharge ports U11b is supplied to the metal sheet MS. As a result, as shown in FIG. 5, the adhesive AD is applied to a first region R1, which may be hereinafter referred to as a first part, of a predetermined region R serving as the punched member W of the metal sheet MS (see the light gray part in FIG. 5).

Figure 5:
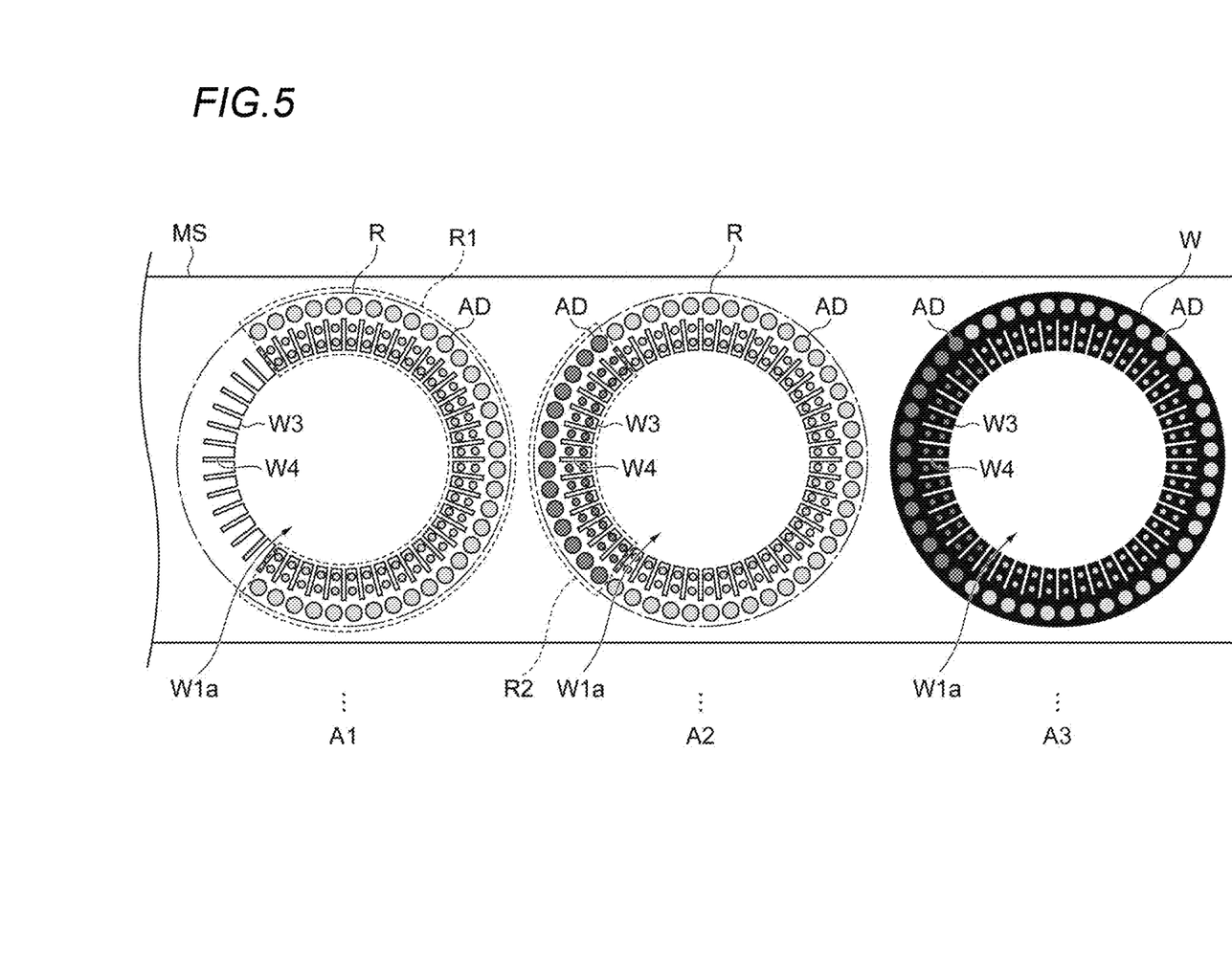
FIG. 5 is a diagram showing an example of a layout for punching a stator laminated iron core.

In the example of FIG. 5, the predetermined region R is a region surrounded by an imaginary line corresponding to an outer peripheral edge of the punched member W and an inner peripheral edge of the punched member W defined by the plurality of tooth portions W3 and the plurality of slots W4. The first region R1 is a part of the predetermined region R and is the part that corresponds to the plurality of discharge ports U11b. Therefore, in the example of FIG. 5, the first region R1 as a whole has a C-shape that is open toward the upstream side of the metal sheet MS (major arc shape).

On the other hand, a case where the supply plate U11 is located at the lowered position will be described. At this time, when the upper die 150 is lowered by the pressing machine 160, a front surface of the processing area A1 of the metal sheet MS comes into contact with the stripper 152, while a rear surface of the processing area A1 of the metal sheet MS does not contact the supply plate U11. Therefore, when the upper die 150 is moved up and down, the metal sheet MS is kept in a state of being separated from the plurality of discharge ports U11b, so that the adhesive AD is not applied to the metal sheet MS.

Next, when the metal sheet MS is intermittently fed by the feeding device 120 and the predetermined part of the metal sheet MS (refer to a processing area A2 in FIG. 5) reaches the supply unit U2, the upper die 150 is moved up and down by the pressing machine 160 similarly to the above.

Here, when the processing area A2 reaches the supply unit U2 in a state where the adhesive AD is applied in the supply unit U1, the controller Ctr may instruct the drive mechanism U24 to position the supply plate U21 in the raised position. At this time, when the upper die 150 is lowered by the pressing machine 160, the processing area A2 of the metal sheet MS is sandwiched by the supply plate U21 and the stripper 152.

Next, the controller Ctr instructs the liquid feeding mechanism U23 to push out the adhesive AD toward the plurality of discharge ports U21b, so that the adhesive AD discharged from the plurality of discharge ports U21b is supplied to the metal sheet MS. As a result, as shown in FIG. 5, the adhesive AD is applied to a second region R2, which may be hereinafter referred to as a second part, of the predetermined region R (see the dark gray part in FIG. 5). At this time, together with the adhesive AD applied in the supply unit U1, the processing area A2 is in a state where the adhesive AD is applied to the entire predetermined region R (see the processing area A2 in FIG. 5).

The second region R2 is a part of the predetermined region R that is different from the first region R1, and is the part that corresponds to the plurality of discharge ports U21b. Therefore, in the example of FIG. 5, the second region R2 as a whole has a C-shape that is open toward the downstream side of the metal sheet MS (minor arc shape).

On the other hand, when the processing area A2 reaches the supply unit U2 in a state where the adhesive AD is not applied in the supply unit U1, the controller Ctr may instruct the drive mechanism U24 to position the supply plate U21 in the lowered position. At this time, when the upper die 150 is lowered by the pressing machine 160, a front surface of the processing area A2 of the metal sheet MS comes into contact with the stripper 152, while a rear surface of the processing area A2 of the metal sheet MS does not contact the supply plate U21. Therefore, when the upper die 150 is moved up and down, the metal sheet MS is kept in a state of being separated from the plurality of discharge ports U21b, so that the adhesive AD is not applied to the metal sheet MS. At this time, the processing area A2 is in a state where the adhesive AD is not applied to the predetermined region R at all.

Next, when the metal sheet MS is intermittently fed by the feeding device 120 and the predetermined part of the metal sheet MS (refer to a processing area A3 in FIG. 5) reaches the die member D3, the upper die 150 is moved up and down by the pressing machine 160, and the punching (outer-shape blanking processing) of the metal sheet MS by the punch P3 is performed similarly to the above. As a result, a punched member W having a lower surface thereof applied with the adhesive AD or a punched member W having no adhesive AD applied is formed. The latter punched member W may form the lowermost layer of the stator laminated iron core 1, and the former punched member W may form a layer other than the lowermost layer of the stator laminated iron core 1.

The punched member W after being punched is adhered to, by the adhesive AD, a punched member W punched out previously while being laminated thereon in the die hole D33. At this time, in order to perform rotating lamination on the punched members W, before the metal sheet MS is punched by the punch P3, the controller Ctr may instruct the drive mechanism D34 to rotate the die D32 together with the punched member W in the die hole D33 by a predetermined angle. After a predetermined number of punched members W are laminated in the die hole D33, the stator laminated iron core 1 is completed.

[Effects]

According to the above embodiment, the supply units U1 and U2 respectively supply the adhesive AD to different regions (the first region R1 and the second region R2) of the predetermined region R serving as the punched member W. Therefore, as compared with the case where the adhesive AD is supplied so as to cover the entire predetermined region R of the punched member W, the individual supply units U1 and U2 can be downsized and the flow paths U11a and U21a of the adhesive AD can be simplified. Therefore, the clogging of the adhesive AD is less likely to occur, and the frequency of maintenance work is reduced. Accordingly, a manufacturing cost of the stator laminated iron core 1 can be reduced.

Further, with the individual supply units U1 and U2 being downsized and the flow paths U11a and U21a of the adhesive AD being simplified, a path difference between the respective flow paths U11a, U21a leading to the plurality of discharge ports U11b, U21b becomes small. Therefore, a discharge amount of the adhesive AD from the plurality of discharge ports U11b, U21b is unlikely to vary. Therefore, the flatness, parallelism, and perpendicularity of the stator laminated iron core 1 are improved, so that it is possible to manufacture the stator laminated iron core 1 with high accuracy.

In addition, with the individual supply units U1 and U2 being downsized, it becomes difficult for the supply units U1 and U2 to interfere with other units (for example, the drive mechanism D34 for the rotating lamination of the punched members W) of the manufacturing device 100. Therefore, it is possible to reduce the size of the manufacturing device 100 as a whole and increase a degree of freedom in the layout of the supply units U1 and U2.

According to the above embodiment, the controller Ctr individually controls the liquid feeding mechanisms U13 and U23 and the drive mechanisms U14 and U24, so that the supply units U1 and U2 operate independently. Therefore, it is possible to form both the punched member W to which the adhesive AD is supplied and the punched member W to which the adhesive AD is not supplied at all.

[Modifications]

It should be understood that the disclosure in the present description is merely illustrated in all respect and not restrictive. Various omissions, substitutions, and changes may be made to the above examples without departing from the scope of the claims and the gist thereof.

(1) When manufacturing a stator laminated iron core other than the cylindrical non-split stator laminated iron core 1, the manufacturing device 100 described above may be used. The other stator laminated iron core may be configured with, for example, a split-type iron core block formed by combining a plurality of iron core pieces. Alternatively, the other stator laminated iron core may be configured with, for example, a laminated body obtained by laminating a plurality of bending-type punched members each of which is provided with a plurality of tooth portions on one yoke portion, and has an annular shape by being bent between the tooth portions.

(2) When manufacturing a laminated iron core other than the stator laminated iron core 1 (for example, a rotor laminated iron core), the manufacturing device 100 described above may be used.

(3) When the adhesive AD is not supplied to the metal sheet MS, the controller Ctr may stop the operation of the liquid feeding mechanism U13, the controller Ctr may control the drive mechanism U14 to move the supply plate U11 to the lowered position, or the controller Ctr may execute both of these.

(4) The supply units U1 and U2 may be arranged so as to be adjacent to each other in the conveyance direction of the metal sheet MS. In this case, the supply unit U2 supplies the adhesive AD to the metal sheet MS immediately after the supply unit U1 supplies the adhesive AD to the metal sheet MS. Alternatively, another processing unit may be arranged between the supply units U1 and U2 in the conveyance direction of the metal sheet MS.

(5) The supply units U1 and U2 and each punching unit may be mounted on one die holder 142 as in the above example. The supply units U1 and U2 may be physically separated from each punching unit in the press processing device 130. Alternatively, the supply units U1 and U2 may be configured as devices physically separate from the press processing device 130.

(6) The supply units U1 and U2 may be configured to supply the adhesive AD to a lower face of the metal sheet MS, or may be configured to supply the adhesive AD to an upper face of the metal sheet MS.

(7) In the above examples, the adhesive AD is supplied to the supply unit MS in two times by the two supply units U1 and U2, but the adhesive AD may be supplied to the metal sheet MS in three or more times by using three or more supply units.

Figure 6:
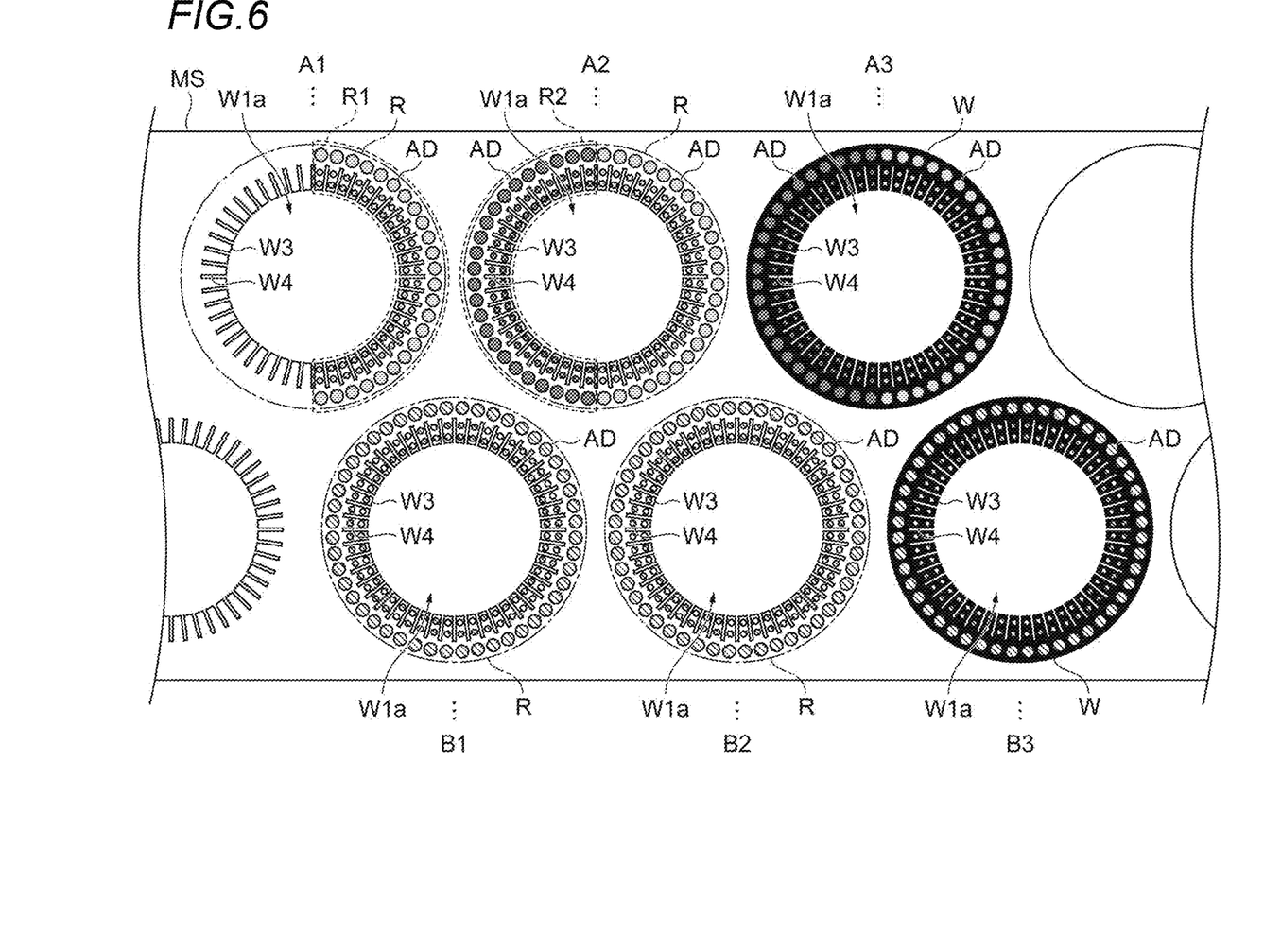
FIG. 6 is a diagram showing another example of a layout for punching a stator laminated iron core.

(8) As illustrated in FIG. 6, the manufacturing device 100 may be used in the case of performing the so-called "multi-row machining" in which the punched members W are separately formed in a plurality of rows arranged in a width direction of the metal sheet MS. In the example shown in FIG. 6, at a processing area A1 in the upper row, the adhesive AD is applied to the first region R1 which is the right half of the predetermined region R. Then, at a processing area A2 in the upper row of FIG. 6, the adhesive AD is applied to the second region R2 which is the left half of the predetermined region R. Thereafter, at a processing area A3 in the upper row of FIG. 6, the metal sheet MS is punched in the predetermined region R to form the punched member W. On the other hand, in the example shown in FIG. 6, the adhesive AD is applied to the entire predetermined region R at a processing area B1 in the lower row. It may be expressed in other words that the adhesive AD is applied to the predetermined region R to be arranged substantially as an annular shape, instead of an arc shape. Then, at a processing area B2 in the lower row of FIG. 6, the metal sheet MS is not processed (punching or application of the adhesive AD). Thereafter, at a processing area B3 in the lower row of FIG. 6, the metal sheet MS is punched in the predetermined region R to form the punched member W. In the upper row and the lower row of FIG. 6, the adhesive AD may also be supplied to different parts of the predetermined region R in two or more times.

OTHER EXAMPLES

Example 1

An example of a device (100) for manufacturing a laminated iron core (1) may include a first supply unit (U1) configured to supply a first adhesive (AD) to a first part (R1) of a predetermined region (R), the predetermined region (R) corresponding to a punched member (W) of a strip-shaped metal sheet (MS) intermittently fed in one predetermined direction, and a second supply unit (U2) arranged at a downstream side in a conveyance direction of the metal sheet (MS) with respect to the first supply unit (U1), and configured to supply a second adhesive (AD) to a second part (R2) different from the first part (R1) of the predetermined region (R). The example of the device (100) for manufacturing the laminated iron core (1) may further include a punching unit (D3, P3) configured to punch the predetermined region (R) of the metal sheet (MS) to which the first supply unit (U1) and the second supply unit (U2) supply the first adhesive (AD) and the second adhesive (AD), so as to form the punched member (W) having the first adhesive (AD) and the second adhesive (AD) applied on the first part (R1) and the second part (R2). In this case, the first and second supply units respectively supply the adhesive to different regions (the first part and the second part) of the predetermined region serving as the punched member. Therefore, as compared with the case where the adhesive is supplied so as to cover the entire predetermined region of the punched member, the individual supply units can be downsized and the flow paths of the adhesive can be simplified. Therefore, the clogging of the adhesive is less likely to occur, and the frequency of maintenance work is reduced. Accordingly, a manufacturing cost of the laminated iron core can be reduced. Further, with the individual supply units being downsized and the flow paths of the adhesive being simplified, a path difference between the respective flow paths leading to a plurality of nozzles becomes small. Therefore, even if each of the first and second supply units includes a plurality of nozzles for discharging the adhesive, a variation in the discharge amounts of the adhesive from the plurality of nozzles is less likely to occur. Therefore, the flatness, parallelism, and perpendicularity of the laminated iron core are improved, so that it is possible to manufacture the laminated iron core with high accuracy. In addition, with the individual supply units being downsized, it becomes difficult for the supply units to interfere with other units of the manufacturing device. Therefore, it is possible to reduce the size of the manufacturing device as a whole and increase a degree of freedom in the layout of the first and second supply units.

Example 2

The device (100) according to Example 1 may further include a third supply unit configured to supply a third adhesive (AD) to at least one part of another predetermined region located side by side with the predetermined region in a width direction of the metal sheet (MS), the another predetermined region corresponding to another punched member of the metal sheet (MS). In addition, the device (100) according to Example 1 may include another punching unit configured to punch the another predetermined region of the metal sheet (MS) to which the third supply unit supplies the third adhesive (AD), so as to form the another punched member having the third adhesive (AD) applied on the at least one part. In this case, the same effects as those in Example 1 can be obtained even in the case of performing the so-called "multi-row machining" in which the punched members (the punched member and the another punched member) are separately formed in a plurality of rows arranged in the width direction of the metal sheet.

Example 3

In the device (100) according to Example 2, the third supply unit may be configured to supply the third adhesive (AD) entirely to the another predetermined region.

Example 4

The device (100) according to any one of Example 1 to Example 3 may further include a controller (Ctr) configured to independently control an operation in which the first supply unit (U1) supplies the first adhesive (AD) to the metal sheet (MS) and an operation in which the second supply unit (U2) supplies the second adhesive (AD) to the metal sheet (MS). The second supply unit is located on the downstream side of the first supply unit, so that the supply of the adhesive to the metal sheet by the second supply unit is performed in a different step from the supply of the adhesive to the metal sheet by the first supply unit. For this reason, the adhesive is applied only to the second part of the predetermined region if the supply of the adhesive by the first and second supply units is stopped at the same time when the predetermined region of the metal sheet is located in the first supply unit, and then the supply of the adhesive by the first and second supply units operates at the same time when the predetermined region of the metal sheet is located in the second supply unit, for example. However, according to Example 3, the first and second supply units operate independently, so that a punched member in which the supply of the adhesive by the first and second supply units is not performed (the adhesive is not applied at all) can be formed.

Example 5

In the device (100) according to any one of Example 1 to Example 4, the first supply unit (U1) and the second supply unit (U2) may be arranged side by side with each other in the conveyance direction of the metal sheet (MS).

Example 6

In the device (100) according to any one of Example 1 to Example 5, the first supply unit (U1), the second supply unit (U2) and the punching unit (D3, P3) may be mounted on a single platform (142), or may be provided individually to each other.

Example 7

An example of a method for manufacturing a laminated iron core (1) may include supplying a first adhesive (AD) to a first part (R1) of a predetermined region (R), the predetermined region (R) corresponding to a punched member (W) of a strip-shaped metal sheet (MS) intermittently fed in one predetermined direction, and supplying a second adhesive (AD) to a second part (R2) different from the first part (R1) of the predetermined region (R) after supplying the first adhesive (AD) to the first part (R1). The example of the method for manufacturing the laminated iron core (1) may further include punching the predetermined region (R) of the metal sheet (MS) after supplying the second adhesive (AD) to the second part (R2), so as to form the punched member (W) having the first adhesive (AD) and the second adhesive (AD) applied on the first part (R1) and the second part (R2). In this case, the same effects as the device according to Example 1 can be obtained.

Example 8

The method according to Example 7 may further include supplying a third adhesive (AD) to at least one part of another predetermined region located side by side with the predetermined region (R) in a width direction of the metal sheet (MS), the another predetermined region corresponding to another punched member of the metal sheet (MS). In addition, the method according to Example 6 may further include punching the another predetermined region of the metal sheet after supplying the third adhesive to the at least one part, so as to form the another punched member having the third adhesive applied on the at least one part. In this case, the same effects as the device according to Example 2 can be obtained.

Example 9

In the method according to Example 8, the supplying the third adhesive (AD) to the at least one part may include supplying the third adhesive (AD) entirely to the another predetermined region.

Example 10

In the method according to any one of Example 7 to Example 9, the supplying of the second adhesive (AD) to the second part (R2) may be performed immediately after the supplying of the first adhesive (AD) to the first part (R1).

What is claimed is:

1. A method for manufacturing a laminated iron core, the method comprising:
supplying a first adhesive to a first part of a predetermined region, the predetermined region corresponding to a punched member of a strip-shaped iron containing metal sheet intermittently fed in one predetermined direction;
supplying a second adhesive to a second part of the predetermined region that is different from the first part of the predetermined region after supplying the first adhesive to the first part; and
punching the predetermined region of the strip-shaped iron containing metal sheet after supplying the second adhesive to the second part, so as to form the punched member having the first adhesive and the second adhesive applied on the first part and the second part,
wherein a first area in which the first adhesive is applied to the predetermined region and a second area in which the second adhesive is applied to the predetermined region are separate areas in a conveyance direction of the metal sheet, and
wherein the punched member has a shape corresponding to a shape of the laminated iron core.

2. The method according to claim 1, further comprising:
supplying a third adhesive to at least one part of another predetermined region located side by side with the predetermined region in a width direction of the strip-shaped iron containing metal sheet, the another predetermined region corresponding to another punched member of the strip-shaped iron containing metal sheet; and
punching the another predetermined region of the strip-shaped iron containing metal sheet after supplying the third adhesive to the at least one part, so as to form the another punched member having the third adhesive applied on the at least one part.

3. The method according to claim 2, wherein the supplying of the third adhesive to the at least one part includes supplying the third adhesive entirely to the another predetermined region.

4. The method according to claim 1, wherein the supplying of the second adhesive to the second part is performed immediately after the supplying of the first adhesive to the first part.

* * * * *